United States Patent [19]
Shioya

[11] 3,886,353
[45] May 27, 1975

[54] AUTOMATIC CONTINUOUS CONTAINER INSPECTING METHOD AND APPARATUS

[75] Inventor: Kazuhisa Shioya, Tokyo, Japan

[73] Assignees: Tatibana Works, Limited; Diichi Seiyaku Company, Limited, both of Tokyo, Japan

[22] Filed: Dec. 28, 1973

[21] Appl. No.: 429,666

[30] Foreign Application Priority Data
Dec. 29, 1972  Japan............................ 48-1309
Dec. 29, 1972  Japan............................ 48-1310
Dec. 29, 1972  Japan............................ 48-1311
Dec. 29, 1972  Japan............................ 48-1452

[52] U.S. Cl. ............................ 250/223 B; 356/240
[51] Int. Cl. ............................................ H01j 39/12
[58] Field of Search ............ 250/223 R, 223 B, 224, 250/572; 209/111.7; 356/240

[56] References Cited
UNITED STATES PATENTS

| | | | |
|---|---|---|---|
| 3,029,349 | 4/1962 | Schell | 356/240 |
| 3,245,529 | 4/1966 | Doud | 356/240 |
| 3,351,198 | 11/1967 | Wyman | 250/223 B |
| 3,411,009 | 11/1968 | Ford | 250/223 B |
| 3,415,370 | 12/1968 | Husome | 250/223 B |
| 3,434,594 | 3/1969 | Husome | 250/223 B |
| 3,528,544 | 9/1970 | Noguchi | 209/111.7 |
| 3,750,877 | 8/1973 | Dvacho | 209/111.7 |
| 3,797,632 | 3/1974 | Riggs | 250/223 B |

*Primary Examiner*—James W. Lawrence
*Assistant Examiner*—D. C. Nelms
*Attorney, Agent, or Firm*—Karl W. Flocks

[57] ABSTRACT

A continuous container inspecting method and an apparatus for practicing such method, in which the light-pervious containers to be inspected are moved linearly in succession while rotating each of them at high speed, and light rays are projected through each said moving container from a fixed light source and if the projected light rays are irregularly reflected by a flaw or flaws on or an alien matter or matters in any of the containers, such irregularly reflected rays are captured by a detecting means having a wider range of vision than the container to thereby detect any flaw or alien matter in any of the containers inspected. Continuous inspection of the moving containers is made possible by enlarging the range of vision of the detecting means and by moving the containers linearly in the direction perpendicular to said detecting means. Further, since the light projecting hole formed to merely allow passage of such light rays that can irradiate only one piece of container is moved between the moving container to be checked and the light source in conformity to movement of the container, only one container within the range of view of the detecting means is irradiated, with the inspection being not affected by other containers in said range, thus ensuring increased precision of inspection.

28 Claims, 10 Drawing Figures

AUTOMATIC CONTINUOUS CONTAINER INSPECTING METHOD AND APPARATUS

BACKGROUND OF THE INVENTION

This invention relates to a method of and an apparatus for automatically detecting flaws, cuts or such on or alien matters in fluid in the transparent or half-transparent containers such as ampuls which are pervious to light.

Heretofore, inspections of this type have resorted mainly to eye-observation. Namely, in the case of ampuls for instance, such ampuls are turned upside down one by one while carefully watching sedimentation or floating of alien matters that may take place by such inversion, under suitable illumination and, if need be, by using a magnifying lens or like means. Such manual operation, however, is low in inspecting performance and also affected by the talent of the indivisual observers. Further, there is a high possibility that the alien matters should escape from the observer's notice. Particularly, the matters such as fine glass pieces moving close to the tubular wall of an ampul are hard to see and hence, in many cases, such matters are left unnoticed.

Efforts are being therefore made for developing a device which is capable of automatically inspecting the ampuls or other containers with high precision and efficiency. In the known automatic ampul inspecting apparatus, each ampul to be checked is sustained at an end of a turret which makes gentle circular motion, and at a point during gentle circular movement of the ampul with the turret, said ampul is suddenly revolved about its own axis at high speed and then reversed in its direction of revolution so that the alien matter, if any present mixed in the ampul content, will be gathered in the center of the ampul, and then light rays are applied to the ampul so that such light rays will be irregularly reflected by the alien matter, so as to let known presence of the alien matter by such irregular light reflection. However, any of such known apparatuses is not satisfactory for the following reasons. Firstly, the inspecting speed is low. Since the irregular reflected rays from the alien matters in the ampul are extremely weak, a certain period of observation is required for detecting such weak light rays by a detecting device, and for this reason, the ampul must be stopped and kept stationary for a certain period of time at the position just before the detecting device. Such temporary, stopping of each ampul before the detecting device necessitates intermittent movement of the turret. Therefore, extra time is required for effecting frequent acceleration and deceleration of the turret, resulting in low inspecting speed. Further, such intermittent operation of the turret complicates the running mechanism. For performing inspection of the ampuls by moving them continuously before the detecting means, said detecting means and light source must be also moved in accordance with movement of the ampuls, requiring means for effecting such movements of the detecting means and light source. Further, it is actually undesirable to move the detecting means because it is a very delicate instrument for which high accuracy is required. Another serious defect of the conventional inspecting devices resides in the ampul sustaining system. The ampul sustaining system in the conventional devices is of the type in which each ampul is held at its top pointed end and bottom, so that when the ampul is held or when the ampul, after held, is rotated at high speed, it is liable to be damaged. Still another defect of the conventional inspection machines is found in the selecting means for selecting and separating the conforming articles from the non-conforming ones. Known as the selecting means is a system in which each ampul delivered out after inspection is further transferred while retained by vacuum in a recess formed circumferentially in a star wheel, and if the ampul delivered is non-deflective, it is immediately separated from the recess and passed into normal passage, but if the ampul delivered is defective, it is kept retained by vacuum in the recess and further carried until it reaches a location above a deflective ampul depository, where vacuum is shut off to discharge the ampul from the recess into said depository. However, use of vacuum as in said system is inevitably attended by certain time delay, that is, considerable time is required for retaining the ampul by vacuum force in the recess, resulting in low ampul separating speed and poor processing performance.

SUMMARY OF THE INVENTION

An object of the present invention is to provide an automatic container inspecting method and apparatus whereby the flaws or cuts on the containers or the alien matters mixed in the liquid in the containers can be automatically and quickly detected.

Another object of the present invention is to provide a method and an apparatus for inspecting the containers by moving them continuously while projecting light therethrough from a fixed light source, by using a detecting means provided at a fixed position.

According to the present invention, in order to inspect the moving containers by a fixed detecting means at high accuracy, the detecting means is designed to provide a wider range of view than the containers and also the inspecting time is prolonged. Also, for increasing the inspection precision, the containers to be inspected are moved linearly in the direction perpendicular to the detecting means so that the containers traversing the range of view of the detecting means will move along the line of the same distance from the detecting means so that the images formed by the detecting means will not become dim. It is also effective for elevating the inspection precision to provide a light projection hole between the light source and the container so that said hole will be moved in accordance with movement of the container and will be capable of irradiating only one piece of container. Thus, according to the present invention, it becomes possible to inspect the containers while continuously moving them by using a fixed light source and detecting means. Further, the device of the present invention, as compared with the conventional ones, is simplified in mechanism and also markedly improved in its inspecting speed and processing performance.

Still another object of the present invention is to provide an automatic container inspecting apparatus including a means for quickly separating the non-defective from the defective after inspection. The separating means used in the present invention comprises two star wheels each of which has formed along its circumference a plurality of recesses so shaped as to receive and retain the containers therein. Said two star wheels are arranged to rotate parallel to each other but in the opposite directions about their respective center axes such that the recesses along the circumferences of the respective wheels will meet or face each other in succession. Each container which has undergone inspection is brought down while retained by one of the two star wheels, and then is retained by two facing recesses of the two star wheels at the position where the corresponding recesses of both wheels meet, and then is further transferred while retained by either of the two star wheels according to whether the particular container is conforming or non-conforming. In this case, for transferring the container, which has been retained jointly by two star wheels, to one of said wheels, compressed air is ejected from the bottom of the particular recess of the star wheel in which the container is to be retained, so that said container will be sucked and held to the recess of the just mentioned star wheel. Use of compressed air for transferring the container in said manner has the advantage that quick response is obtained and that the separating speed is elevated.

A further object of the present invention is to provide an automatic ampul inspecting apparatus including an ampul retaining means capable of transporting the ampuls while rotatably holding them with little fear of damaging them. The ampul retaining means used in the present invention includes members which can hold not only the top end of the ampul but also its shoulder portion, so as to minimize possibility of causing damage to the ampul top end.

The above-said and other objects, features and advantages of the present invention will become apparent from considering following detailed description of the embodiments of the invention when taken in conjunction with the accompanying drawings.

Figure 1:
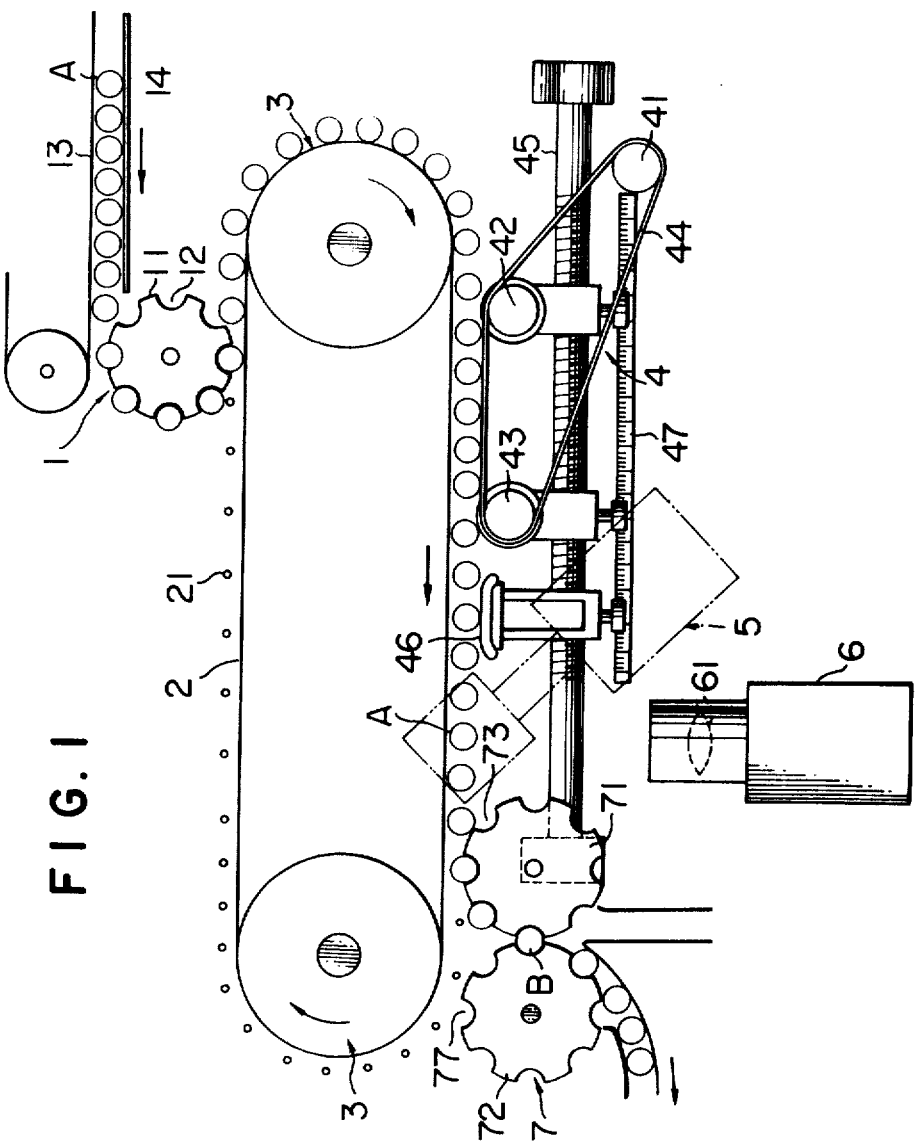
FIG. 1 is a schematic top plan of a continuous automatic container inspecting apparatus according to the present invention as used for inspection of ampuls.

Referring first to FIG. 1, there is shown a continuous automatic ampul inspecting apparatus embodying the present invention. The apparatus comprises principally a feeder means 1, an endless holder train 1, a pair of revolving members 3, an ampul rotating means 4, a light source means 5, a detecting means 6, and a selecting means 7. The feeder means 1 includes a feed rotor 11 having a plurality of ampul receiving and holding recesses 12 arranged at constant intervals along the circumference thereof. Said rotor is also connected at its bottom to a driving means (not shown) for rotating said rotor counterclockwise. The pitch of said recesses 12 is same as that of the holders in the endless holder train 2 which is described later. Said feeding rotor 11 is mounted at the position where the ampuls held in the respective recesses 12 will be aligned with the center line of the holders of said endless holder train 2. For feeding the ampuls to said feed rotor 11 successively, there are provided a belt 13 and a side plate 14 arranged parallel to and spaced apart from said belt 13 a distance sufficient to allow passage therebetween of only one row of ampuls. Thus, the ampuls A are fed orderly in a row between said belt 13 and side plate 14 and then received and held in the respective resesses 12 of the feed rotor 11, whence they are further carried to the holder train 2 one after the other. At the bottom of each of said recesses 12 is provided a compressed air jet (not shown) from which compressed air is ejected when a recess arrives at the position where it receives an ampul from the belt 13, so as to hold the ampul in the recess by the sucking action of compressed air, and when the feed rotor 11 turns and said particular recess reaches the positions where it contacts the holder assembly 2, compressed air is shut off to release the ampul out of the recess.

Figure 8:
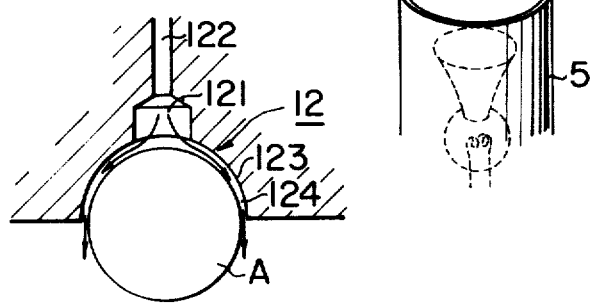
FIG. 8 is an enlarged sectional view of a recess formed in the feed rotor shown in FIG. 1.
Figure 9:
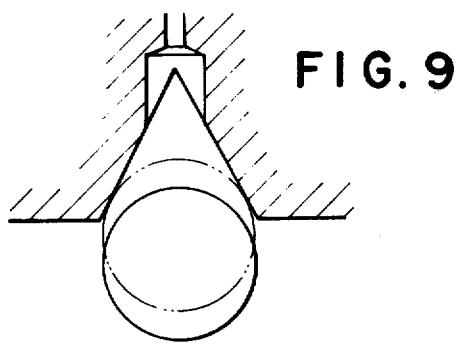
FIGS. 9 and 10 are sectional views showing modified forms of the recess of FIG. 8.
Figure 10:
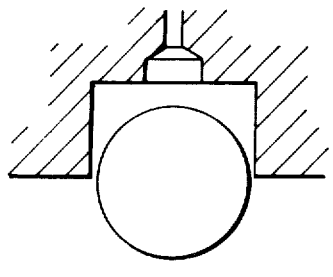

The mold of holding an ampul in recess by dint of compressed air is now explained in detail with reference to FIG. 8 which shows a recess 12 in an enlarged view. As will be understood, the recess 12 is of a size suffient to contain at least a portion of the side of the ampul A and may be arc-shaped in section as shown. Centrally at the bottom of the recess 12 is provided a compressed air jet 121 which is connected through a hole 122 to a compressed air source (not shown) provided outside of the apparatus. When compressed air is ejected from the jet 121 in a state where an ampul A has been received in the recess 12 as shown in FIG. 8, said compressed air is urged to flow outwardly passing through a narrow space 124 defined between the side face 123 of the recess 12 and the opposed surface of the ampul A. As compressed air is forced out through such narrow space 124, the air flow velocity is excessively increased at this position, consequently producing a negative pressure which acts to suck up the ampul A toward the side face 123 of the recess 12, thereby holding the ampul A in the recess. The sectional configuration of the recess 12 may not necessarily be arc-shaped as in the embodiment of FIG. 8; it may be triangular as shown in FIG. 9 or rectangular as shown in FIG. 10.

Figure 2:
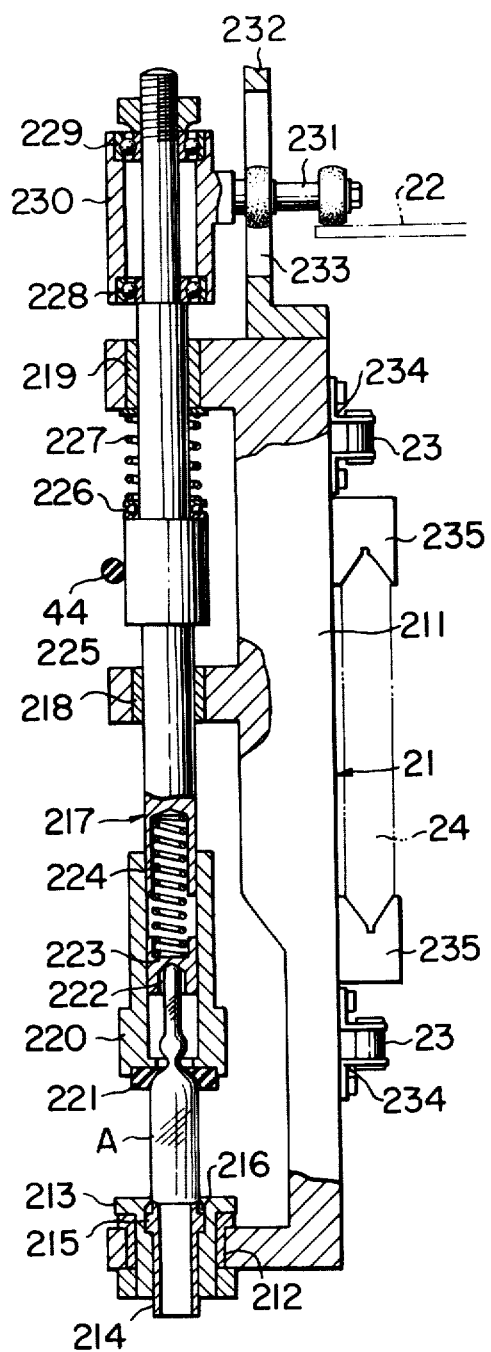
FIG. 2 is a transverse sectional view of the holder mechanism used in the said apparatus for rotatably holding the ampuls.
Figure 3:
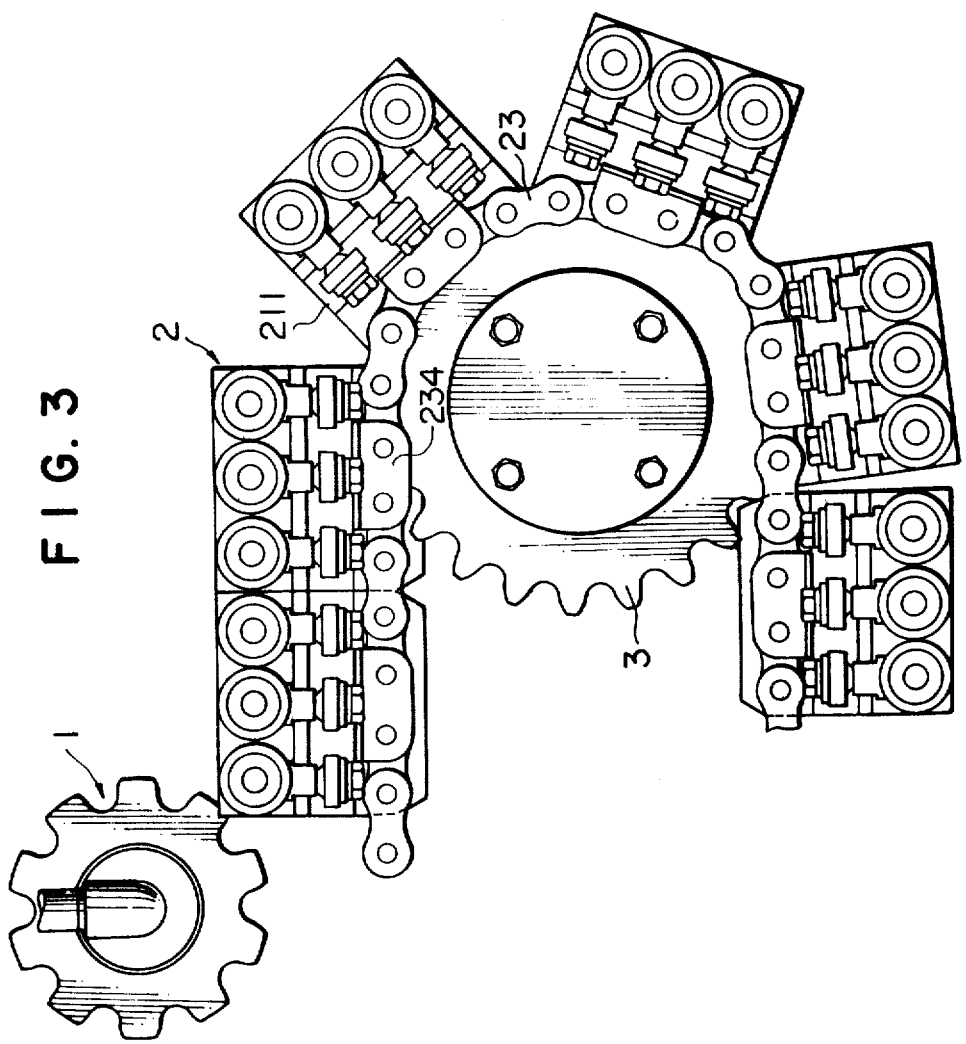
FIG. 3 is a plane view showing the ampul feeder means, ampul revolving means and a part of the holder assembly.

The endless holder train 2 comprises a plurality of holders 21 (shown by small circles in FIG. 1 for sake of simplicity) arranged in the form of an endless ring or loop, with the details thereof being shown in FIGS. 2 and 3.

In FIG. 2, numeral 211 indicates a bracket having at its bottom an ampul rest 213 rotatably supported by a metal element 212 secured to said bracket 211. The ampul rest 213 is a hollow cylindrical body having in its inside a vertically movable sleeve 214 having at its upper end a flange 215 which fits in a circular recession 216 in the interior of the ampul rest 213. The axial length of the flange 215 is slightly shorter than the axial length of the recession 216 to allow vertical movement of the sleeve 214 through the distance of such axial length difference. Said sleeve 214 is also so arranged that normally the top surface thereof stays slightly lower than the top surface of the ampul rest 213 but will be raised slightly higher than the latter when the sleeve 214 is pushed upwardly. The ampul A has its bottom held in a cavity defined by the ampul rest 213 and the sleeve 214. It may be easily removed by merely pushing up the sleeve 214. The sleeve 214 is hollowed so that, when the bottom of the ampul A is held in position, said sleeve will hold only the strong outer peripheral portion, and light is projected to the ampul from the hollow portion of the sleeve. Upwardly of and on the same axial line of the ampul rest 213 is provided an ampul retainer 217 which is rotatably supported by a metal element 218 secured to the bracket 211. Said ampul retainer 217 has secured to its bottom end a hollow block 220 for holding the shoulder portion of the ampul, and an elastic material 221 is bonded to the bottom end of said hollow shoulder holder 220 where it is contacted with the ampul shoulder. In the cylindrical smoothly machined interior of said hollow shoulder holder 220 is slidably disposed an ampul end receiver 223 having a hollow 222 for receiving and holding the top ampul end. The bottom of said hollow 222 of the ampul end receiver 223 is shaped conical or spherical so as to guide the ampul end in alignment with the axis of the ampul holder. On the upper side of said ampul end receiver 223 is mounted a compression coil spring 224 which is adapted to constantly press said ampul end receiver 223 downwardly. At the middle part of said ampul retainer 217 is formed a pulley 225 which is driven by an outside belt 44, and a compression coil spring 227 is mounted through a bearing 226 between said pulley and a metal element 219 secured to the bracket 211, so as to constantly depress the ampul retainer 217. Mounted at the upper end of the ampul retainer 217 through bearings 228 and 229 is a cylindrical block 230 to which is secured an arm 231 for operating and for stopping rotation of said cylindrical block 230. Said arm 231 is inserted into an elongated slot 233 in a support member 232 secured to the bracket 211, so as to stop rotation of the cylindrical block 230. The other end of the arm 231 is engaged with a cam 22 provided along the locus of movement of the endless holder train 2, so as to move the ampul retainer 217 up or down according to the position of said cam. As seen in FIG. 3, three ampuls are carried by one bracket 211, and such brackets 211 are connected at two upper and lower locations to a roller chain 23 by fixing plates 234. Numeral 235 in FIG. 2 indicates the guides arranged to slide in engagement with a guide rail 24 laid along the locus of movement of the endless holder train 2.

Now, the operations for mounting and releasing the ampuls with ampul holders 21 are discussed. For holding an ampul in position, the arm 231 is pushed up to widen the space between the ampul retainer 217 and the ampul rest 213 and an ampul A is placed in said space, followed by release of the arm 231. Whereupon the ampul retainer 217 is urged to descend by the action of the compression coil spring 227, and first the ampul end receiver 223 contacts with the top ampul end to let the center line of the ampul align with the center line of the ampul retainer 217 owing to the hollow 222. The ampul retainer 217 further descends until the ampul shoulder holder 220 comes to hold the shoulder of the ampul A. It is to be noted that since the ampul end receiver 223 is designed to act for centering the ampul, the compression coil spring 224 is arranged to be rather weak in its pressing force so that it won't hold the ampul end so strongly. In some cases, such compression coil spring 224 may be omitted and arrangement may be made such that the ampul receiver 223 will be brought down, for its own weight, into contact with the ampul end. The ampul end receiver 223 is preferably made of synthetic resin so as not to damage the ampul. For removing the ampul, the arm 231 is raised up and the sleeve 214 is also raised up in the inside of the ampul rest 213 so that the top face of the sleeve 214 will be raised above the top face of the ampul rest 213, whereby the ampul can be easily removed out sidewise. Upward or downward movements of the arm 231 and sleeve 214 are effected by cams provided along the track of the ampul holders 21.

As described above, according to the holder means of the present invention, the ampul shoulder is held for sustaining the upper portion of the ampul, so that the possibility of breaking the ampul is minimized, and further, since centering of the ampul is effected by sustaining the ampul end with the ampul end receiver before holding the ampul shoulder portion, it is possible to hold the ampul in correct position relative to the ampul holder and ampul rest, and hence no trouble is produced in rotating the ampul. Further, as ampul rotation is performed by directly actuation the ampul holder which is increased in its weight as well as in its inertia and rotational resistance owing to its vertical motion, the ampul is merely required to transmit its rotation to the ampul rest during rotation of the ampul, so that no large torque is imparted to the ampul to make it more proof against damage.

In FIG. 1, the endless holder assembly 2 is arranged in the form of an oval-shaped loop in engagement with two rotary bodies or chain wheels 3. One or both of said chain wheels 3 are connected to driving means (not shown) to move the holder assembly 2 in the direction of arrow at a set velocity. The moving speed of the holder train 2 is adjusted to be same as the turning speed of the recesses 12 of the feed rotor 11 and that of the recesses 73 of the star wheel 71 of selecting means 7 to be described later. Along the inside of the holder train 2 is laid a guide rail, shown by numeral 24 in FIG. 2, so as to support the holder trainer. Also provided along the holder train 2 is a cam, shown by numeral 22 in FIG. 2, so as to control the position of the ampul retainer 217. This cam 22 is arranged to raise up the ampul retainer 217 at the portion where the holder train 2 contacts with the feed rotor 11, so as to allow insertion of the ampul sidewise in a corresponding ampul holder 21, while lowering the ampul holder on the right side of this position to retain the ampul in the holder 21. In this way, each of the ampuls delivered by the feed rotor 11 is automatically inserted and held between the ampul rest 213 and the ampul retainer 217 of the bolder 21.

Adjacent to the holder train 2 moving linearly passing round the rotary body 3 on the right-hand side (in the drawing) is provided a rotating means 4 comprising a driving pulley 41, two driven pulleys 42, 43 and a belt 44. The belt 44 contacts with the pulley portion 225 of each holder 21 to let the ampul rotate at high speed. In order to ensure positive contact between said belt 44 and pulley portion 225, it is advisable to provide a suitable tension pulley (now shown) adapted to press the belt 44 against the pulley portion 225. Driving of the holders 21 may be accomplished by contacting the driven pulleys 42, 43 with the pulley portion 225. Preferably, the driven pulleys 42, 43 are threadedly engaged with the respective threaded shafts (only one threaded shaft 45 is shown in FIG. 1), because the positions of the driven pulleys 42, 43 can be easily changed by merely turning such threaded shafts 45. It is also desirable to provide a suitable tension means which allows the belt 44 to maintain a constant tension regardless of movements of the driven pulleys 42, 43. Provided next (on the left side in FIG. 1) to said driven pulleys 42, 43 is a brake plate which is secured in position by a threaded shaft (not shown) provided separate from the above-mentioned threaded shafts for securing said driven pulleys. This brake plate 46 is adapted to stop rotation of the pulley portion 225 of the holder 21 by pressing it with a suitable pressure. This means is provided for the following reason. That is, when inspecting the ampuls containing liquid, if each such ampul is once rotated in one direction at high speed and then stopped suddenly to let the liquid therein alone revolve with inertia, the alien matters, if any, in the liquid gather in the center to facilitate inspection. For certain types of substances contained in the ampuls, inspection can be performed satisfactorily by merely revolving the ampul in one direction alone. In such case, the brake plate 46 may be placed distant from the holders 21 or may be omitted. There are also cases where it is required to turn the ampul first in one direction and then in the opposite direction. In such cases, a means capable of rotating the ampuls in both directions may be provided in place of the brake plate 46. In case of checking flaws or cuts on the empty ampuls (as the ampuls are kept rotated in this case, too), the brake plate 46 may be either placed spaced apart from the holders 21 or reduced in its pressing force to lessen the rotational frequency of the ampuls. A scale plate 47 is provided parallel to the threaded shafts 45 to indicate the positions of the driven pulleys and brake plate.

Figure 4:
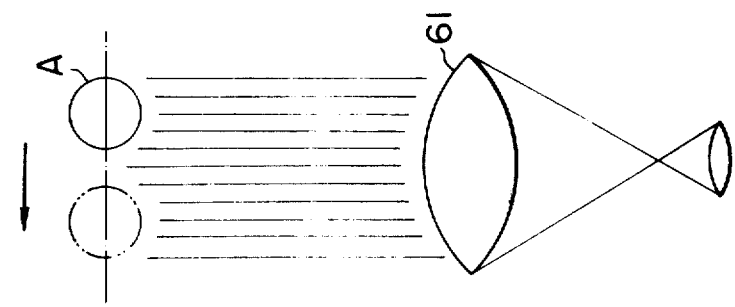
FIG. 4 is a sketch diagrammatically illustrating the positional relation between an ampul being transported and the lens in the detecting means.

Along the line of holders leftward (in FIG. 1) of said rotating means 4 are provided a light source means 5 and a detecting means 6 both of which are disposed at the respective fixed positions. The light source means 5, which may be a known type, is provided for projecting light to the ampuls from below thereof. The detecting means 6, which may be also of a known type, is designed to detect the light rays which have been irregularly reflected from a flaw or flaws or an alien matter or matters in the ampuls. The detecting means used in the present invention is one having a wider range of view for inspection than the ampul diameter, and such means is arranged perpendicular to the direction of movement of the holder train 2. For this purpose, the lens 61 of the detecting means 6 is disposed parallel to the holder train 2 as shown in FIG. 4. The light source means 5 is such as capable of irradiating the entire range of view provided by the detecting means 6. According to this arrangement, the detecting means 6 can continue inspection of an ampul during the period when it traverses the range of view of said means. Also, as the distance between the ampul and the lens remains unchanged throughout this period, the image formed won't become dim to permit correct inspection. Enlargement of the view range of the detecting means 6 elongates the inspection time. In other words, it is made possible to let the ampuls move continuously and at a higher speed than possible with the conventional devices, in a certain given inspection time.

Figure 5:
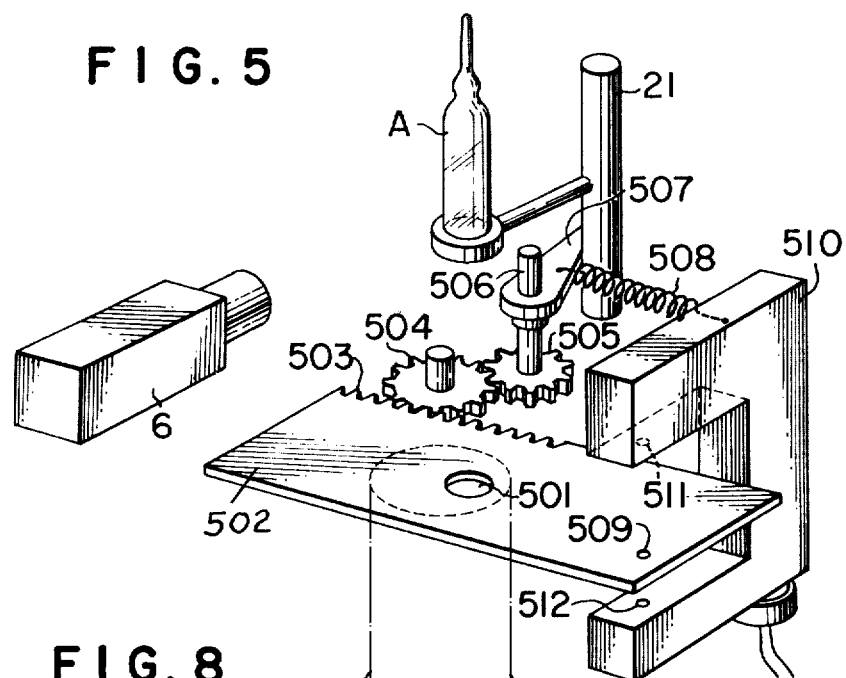
FIG. 5 is a perspective view showing a preferred embodiment of the ampul detecting mechanism.

FIG. 5 shows another preferred form of the ampul inspection mechanism according to the present invention. In FIG. 5 the ampul holder 21 is shown by a simplified shape. In this embodiment, as will be seen in the figure, a light source means 5 capable of emanating light rays of a wider range than the ampul diameter (with the light flux being shown by dotted chain lines) is located below an ampul A to be inspected, and also a detecting means 6 having a greater range of view than the ampul diameter is disposed sidewise of and perpendicular to the direction of movement of the ampul. Between the ampul A and the light source means 5 is disposed a shield plate 502 having a light projecting hole 501 capable of irradiating only one piece of ampul. Said shield plate 502 is provided on a suitable retaining means (not shown) so that said plate is movable in the same direction as movement of the ampul. Along the edge of the shield plate 502 on its side parallel to the direction of ampul movement is formed a rack 503 with which a pinion 504 is meshed. Said pinion 504 is also meshed with a gear 505 fixed on a shaft 506 to which a lever 507 is secured such that the shield plate 502 may be moved by turning said lever 507. The length of the lever 507 is selected such that said lever will be contacted with a part of the ampul holder 21 so that the former will be turned with movement of the latter, bur after turn through a certain predetermined distance, the former will separate from the latter. A coil spring 508 is attached to the lever 507 so as to return it to its original position when it separates from the ampul holder 21 after having been turned through a certain distance by said holder 21. The range of movement of the shield plate 502 by said turn of the lever 507 is within the scope of irradiation of light rays (indicated by dotted chain lines) from the light source 5. The shiled plate moving means, constituted by the rack 503, pinion 504, gear 505 and lever 507, are regulated in their respective dimensions, shapes ad positions such that the position of the ampul A in movement and the position of the light projecting hole 501 will correspond to each other so that the light rays are always applied to the ampul A. The shield plate 502 is also formed with a pulse hole 509, and a pulse generating means 510 is fixedly provided such that it will be in opposed relation to said pulse hole 509 when the shield plate is at the starting position of its movement. The pulse generating means 510 used in this embodiment is U-shaped and arranged such that light rays are given out from a hole 511 in the upper portion of the U-shaped body and received in a corresponding hole 512 in the lower portion thereof to generate a pulse. As will be understood, the light rays from the upper hole 511 can pass through the pulse hole 509 in the shield plate 502 to reach the lower hole 512 only when the shield plate 502 has returned to its movement starting position. The pulse from the pulse generating means 510 is sent to the detecting means 6 so as to section the continuous measurement of ampuls by the detecting means. That is, the detecting means 6 continues measurement of one ampul during the period from the moment when one pulse enters said means till the moment when the next pulse enters.

In the above-described apparatus, each ampul moves while receiving light rays from the light source 5 through the light projection hole 501 in the shield plate 502, and during this period the detecting means keeps observation of the ampul to judge whether it is conforming or non-conforming. Upon completion of checking of one ampul, the shield plate 502 returns to its original position, generating a new pulse to inform the detecting means of change of the ampul to be checked. Then, said shield plate again begins to move following the next ampul to apply the light rays to said next ampul alone, whilst the detecting means checks that particular ampul.

According to the present apparatus as described above, light rays are projected to only one ampul in a series of moving ampuls and said particular ampul, while moving, is checked by the detecting means, so that it is possible to prolong the time for observation by the detecting means notwithstanding the fact that the ampul is moving, so as to provide an ample time for making correct judgement on whether the ampul is non-defective or not. Further, since light is projected to only one of the continuously supplied ampuls, there is no chance that two or more ampuls should enter simultaneously in the view range of the detecting means and also nothing other than the ampul itself is included in observation, so that no error of detection is caused. Still further, since a pulse generated with movement of the shield plate having a light projecting hole is utilized as the signal for dividing the continuous train of ampuls by the detecting means, so that there is produced no gap between movement of the ampul and operating time of the detecting means, thus allowing extremely accurate measurements.

Although in the above embodiment the shield plate having a light projecting hole is designed to let the ampuls move linearly, such shield plate also proves useful for moving the ampuls circularly.

Figure 6:
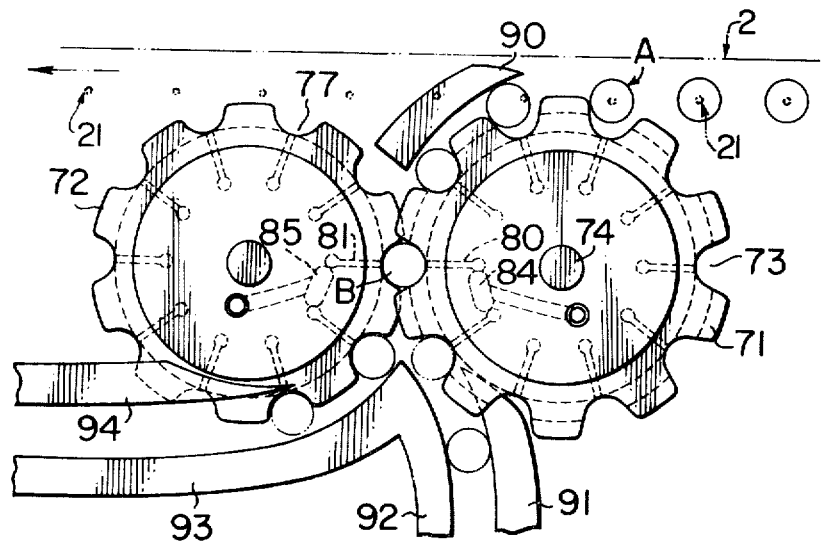
FIG. 6 is a top plan of the ampul separating mechanism.
Figure 7:
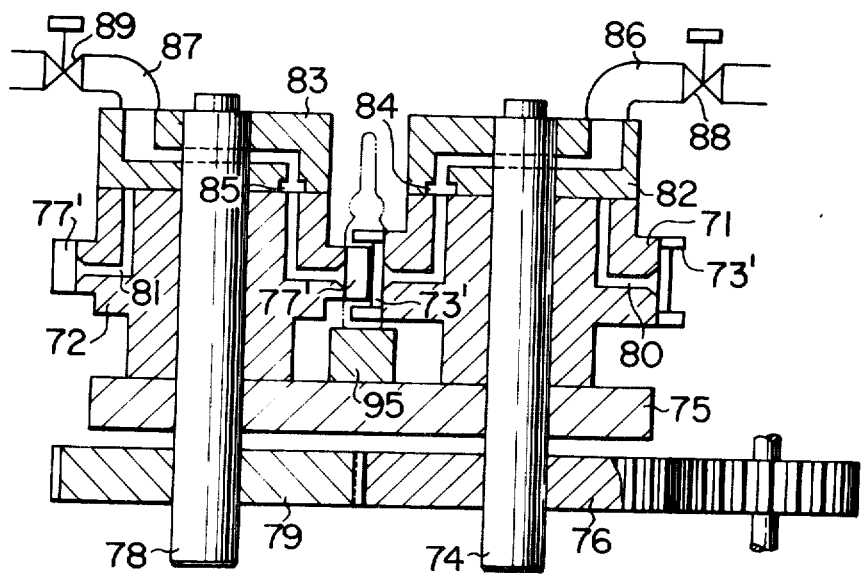
FIG. 7 is a transverse sectional view thereof.

To the left (in FIG. 1) of the detecting means 6 is provided a selecting or discriminating mechanism 7 for discriminating between the defective and non-defective ampuls according to the signals from the detecting means 6. Such discriminating mechanism 7 is now described in detail with reference to FIGS. 6 and 7.

A first star wheel 71 is provided in contact with the endless holder train 2 (shown by two-dotted line) which forms the inspection track. Said star wheel 71 has formed along its circumference a plurality of recesses 73 for receiving and holding therein the respective ampuls, said recesses 73 being arranged at the same pitch as the holders 21 of said endless holder train 2. The star wheel 71 is secured to a revolving shaft 74 which is rotatably journalled by a fixed bracket 75 and which also carries at its lower end a gear 76. A second star wheel 72 is provided in opposed relation with said first star wheel 71. Said second star wheel 72, like the first star wheel 71, has formed along its circumference a plurality of ampul-receiving recesses 77 arranged at the same pitch as the recesses 73 in the first star wheel 71. Said second star wheel 72 is secured to a revolving shaft 78 rotatably journalled by the bracket 75. The first star wheel 71 and the second star wheel 72 are so positioned that one of the recesses 73 of the former and a corresponding one of the recesses 77 of the latter will meet facing each other so as to hold an ampul between such two facing recesses. Also, their respective gears 76 and 79 are meshed such that they turn correspondingly in the opposite directions so that said recesses 73 and 77 will always meet each other successively during rotatin. The gear 76 is meshed with another gear connected to a driving means (not shown). In order that the first and second star wheels 71 and 72 won't touch each other at other part than the respective recesses, the first star wheel 71 is provided at its outer periphery pair of vertically spaced flanges 73' while the second star wheel 72 is provided with a flange 77' designed to pass through the space defined by said flanges 73' of the first star wheel 71. At the bottom of each of said recesses 73 and 77 of both first and second star wheels 71 and 72 is provided a compressed air jet from which compressed air is ejected to retain the ampul in the recess. These recesses and air jets may be same as those shown in FIGS. 8, 9 and 10. The air jets of the respective recesses are connected to the passages 80, 81 extending to the upper faces of the respective star wheels. Said passages 80, 81 are opened in said respective upper faces at the positions which are of equal distance from the respective revolving shafts 74, 78. Provided on the upper faces of the star wheels 71 and 72 are the valve bodies 82 and 83, respectively, so that they are slidable in close attachment on the respective wheel faces. These valve bodies 82 and 83 are fixed against rotation by suitable means so that they won't rotate with the star wheels. In the undersides of said valve bodies 82 and 83 are formed arc-shaped grooves 84 and 85, respectively, which are connected through solenoid valves 88 and 89 to the pipes 86 and 87, respectively, which are in turn connected to an outside compressed air source (not shown). Said grooves 84 and 85 are formed at the positions corresponding to the openings of the passages 80 and 81 in the upper faces of the respective star wheels. They extend from a point on the line connecting the centers of the two star wheels 71 and 72 to a position slightly distance (corresponding to about one pitch of the recesses in the drawing) from said point in the direction of rotation of both star wheels. Thus, when the openings of the passages 80 and 81 in the upper faces of the respective star wheels are aligned with the grooves in the valve bodies 82 and 83 during rotation of the star wheels, said pipes 86 and 87 are communicated with the passages 80 and 81, respectively. The solenoid valves 88 and 89 are arranged to be controlled by the signal from the detecting means 6, and their controlling operations are discussed later. In close adjacency to the star wheel 71 is provided a guide 90 for guiding forward the ampuls which have been supplied from the holders 21 and received in the respective recesses 73. There are also provided guides 91 and 92 for delivering out the ampuls from the recesses. Similar guides 93 and 94 are also provided in relation with the star wheel 72. Numeral 95 indicates a rail on which the ampuls are slided forward. In the passage of the holder train 2 at the location where it is contacted with the star wheel 71, there are provided a cam for raising up the arm 231 of the holder 21 and a cam for raising up the sleeve 214, and at this location the ampul is freed from its hold.

Each ampul, while held and carried by the holder 21, is checked by the detecting means 6 and then forwarded to the selecting mechanism 7. In this mechanism, the first star wheel 71 is rotating in line with the holders 21, and each ampul, in a state of being held by a corresponding holder 21, enters a recess 73 in the first star wheel 71. Then, when the holder 21 releases its hold on the ampul, the latter is now held be a recess 73 and the guide 90 and is turned in the counterclockwise direction by the star wheel 71 and further carried forward. Thus, the ampul is first carred by the first star wheel and then hold by the two opposing recesses of both first and second star wheels 71 and 72 (at the position of B in FIG. 1). Concurrently with this, the solenoid valves 88 and 89 receive a signal from the detecting means 6 and if the ampul at the position of B is non-defective, the solenoid valve 89 communicated with the second star wheel 72 is opened while the other solenoid valve 88 closed, but if the ampul is defective, the solenoid valve 88 is closed and the solenoid valve 89 opened. In this case, since a certain period of time is spent until the ampul reaches the position B after having been checked by the detecting means 6, the signal sent to the solenoid valves 88 and 89 from said detecting means 6 is naturally delayed by the time spent for conveying the ampul. The ampul held by the two opposing recesses of the two star wheels 71 and 72 at the position B is further forwarded into one of the two courses depending on whether the ampul is defective or non-defective. If the ampul is non-defective, the outside compressed air source is connected to the passage 81 on the second star wheel side to eject compressed air from the air jet so as to retain the ampul in a recess 77 in the second star wheel 72 and to thereby further forward said ampul into a passage defined between the guides 93 and 94. On the other hand, if the ampul is defective, compressed air is suppled not to the passage 81 on the second star wheel side but to the passage 80 on the first star wheel side so as to retain the ampul in a recess of the first star wheel and carry said ampul into the passage defined between the guides 91 and 92. Here, the grooves 84 and 85 provided in the respective valve bodies 82 and 83 are only required to have length sufficient to properly carry the ampul held in a recess of one of the star wheels into either the passage defined between the guides 91 and 92 or the passage defined between the guides 93 and 94, and they are not necessarily required to have a length corresponding to one pitch of the recesses 73, 77 as the instant embodiment of the invention.

In the above embodiment, the controlling means for controlling compressed air supply to the passages 80, 81 of the star wheels 71, 72 is composed of the valve bodies having arcuate grooves 84, 85 and the solenoid valves 88, 89, but the present invention is not limited to such arrangement and any other suitable modifications can be made in this connection within the scope of the present invention.

Thus, according to the present invention, each ampul, after once held by two star wheels, is then distributed to one of said two star wheels by utilizing compressed air, so that ampul distribution can be accomplished guickly and correctly, allowing selection of ampuls at far higher speed and accuracy than possible with any of the conventional devices. For instance, the throughout per hour of the conventional vacuum-utilizing selecting devices is less than about 4,000 pieces, whereas the device of the present invention is capable of treating more than 12,000 pieces per hour, thus drastically improving the throughout capacity of automatic container inspecting apparatus.

As described above, the continuous automatic ampul inspecting apparatus according to the present invention is capable of detecting the flaws on or alien matters in the ampuls while continuously transporting them held by holders and, after inspection, can separate the non-defective ampuls from the defective at high speed and accuracy. Consequently, the ampul inspecting speed is surprisingly increased as compared with the conventional devices, and it also becomes possible to minimize the possibility that the ampuls be damaged while they are being transported during the inspecting operations.

The foregoing embodiments are intended to be merely illustrative and not restictive to the scope of the present invention, and it is to be understood that various changes and modifications can be made within the scope of the invention which is to be defined only by the appended claims.

What I claim is:

1. A continuous container inspecting method comprising the steps of:
   revolving each of the containers which are pervious to light;
   moving said containers in line continuously;
   projecting light to each of the linearly moving containers and detecting flaws on and alien matter in each of the containers by a detecting means provided stationarily and perpendicularly to the direction of movement of the containers and having a wider range of view in the direction of movement of the containers than the container.

2. A continuous container inspecting method according to claim 1, including the step of moving a shield plate having a light projecting hole in conformity with movement of the containers, said light projecting hole being disposed betweeen the moving container and a light source and adapted to allow passage of light rays sufficient to irradiate only one container passing through the view of said detecting means.

3. A continuous container inspecting method according to claim 2, further including the step of producing a pulse when said light projecting hole is at a predetermined position, said pulse being applied to said detecting means to start the operation thereof.

4. A continuous container inspecting method comprising the steps of:
   revolving each of the containers pervious to light;
   moving said containers successively;
   moving a shield plate having a light projecting hole in conformity with movement of the containers, said light projecting hole being adapted to allow passage of light rays sufficient to irradiate only one container and disposed between the moving container to be inspected and a fixed light source for projecting light to the moving container; and
   detecting flaws on and alien matters, if any, in the container which is being moved while receiving light rays, by a detecting means having a wider range of view in the direction of movement of the containers than the container.

5. A continuous container inspecting method according to claim 4, further including the step of producing a pulse when said light projecting hole is at a predetermined position, said pulse being applied to said detecting means to start the operation thereof.

6. A continuous automatic container inspecting apparatus comprising:
   means for feeding containers one by one successively;
   an endless train of holders adapted to rotatably hold said containers;
   a pair of revolving members adapted to continuously drive said train of holders;
   means for rotating the containers held by said holders transferred linearly in the section between said pair of revolving members;
   a light source means for projecting light to the containers which have passed by said means for rotating the the containers and are being transferred linerally;

a detecting means provided stationarily and perpendicularly to the linearly transferred train of holders and adapted to capture and detect the irregular reflected light rays from flaws on and alien matters in the container, said detecting means having a wider range of view in the direction of movement of the containers than the container; and a selecting means operable responding to said detecting means to select and respectively discharge the non-defective and defective containers.

7. A continuous automatic container inspecting apparatus as set forth in claim 6, further comprising:

a shield plate disposed between the container to be inspected and the light source and having a light projecting hole allowing passage of light rays sufficient to irradiate only one container; and driving means for moving said shield plate along the path of movement of the container to be inspected in a manner such that said container is continuously irradiated by said light source through the hole of said shield plate, during the movement of said container and said shield plate, and returning said shield plate to its original position when the container reaches to a certain point on said path.

8. A continuous automatic container inspecting apparatus as set forth in claim 7, wherein said selecting means comprising:

a first star wheel having formed along its circumference a plurality of recesses for receiving the respective containers held by said holers.;

a second star wheel also having formed along its circuference a plurality of recesses for receiveing the containers and arranged revolvable corresponding to said first star wheel so that the recesses of said both star wheels will meet each other successively;

means for driving said both star wheels;

jets opened to the bottoms of the recesses in said both star wheels;

a control means for supplying compressed air from an outside compressed air source to said jet leading to only one of the two meeting recess of both star wheels in response to a signal from said detecting means, and passages for delivering out the container held by said both star wheels.

9. An automatic continer inspecting apparatus as set forth in claim 8, wherein said control means for supplying compressed air has passages opened in upper surfaces of said star wheels and connected to the jets opened to the bottoms of said recesses, and valve bodies provided stationary on the upper surfaces of said respective star wheels so that they are slidable relative to said respective star wheels, said valve bodies having in their undersides the arc-shaped grooves engaged with the passages leading to the two facing recesses of the two star wheels, each of said grooves being connected to an outside compressed air source through a solenoid valve controlled by the detecting means.

10. An automatic container inspecting apparatus as set forth in claim 7, wherein said holder train consists of a plurality of holders for rotatably holding the containers therein and a roller chain supporting said holders.

11. A continuous automatic container inspecting apparatus as set forth in claim 7, wherein each said holder comprises a bracket, means for retaining the bottom portion of the container rotatably sustained by said bracket, and means for holding the upper portion of the container rotatably and axially slidably sustained by said bracket, said means for holding the upper portion of the container comprising a pulley portion to which rotative force is given and an arm moved up and down by a cam provided along the passage of the holder train.

12. A continuous automatic container inspecting apparatus as set forth in claim 7, wherein said feeding means comprises a belt conveyor for successively feeding comtainers and a feed rotor having along its circumference a plurality of recesses and arranged to rotate in conformity with said holder train, each of said recesses having at its bottom a compressed air jet from which compressed air is ejected so as to retain the container in the recess, whereby to transfer each container from said belt conveyor means to said holder train.

13. A continuous automatic container inspecting apparatus as set forth in claim 7, wherein said rotating means comprises a driving pulley, driven pulleys mounted on the respective threaded shafts, a belt connecting said driving and driven pulleys, and a scale plate provided parallel to the threaded shafts for indicating the positions of said driven pulleys.

14. A continuous automatic container inspecting apparatus as set forth in claim 7, further including brake means for stopping rotation of the container held by a holder, said brake means being disposed between said rotating means and said detecting means.

15. A continuous automatic container inspecting apparatus as set forth in claim 7, further including means for generating a trigger pulse when said shield plate is at a predetermined position said trigger pulse being applied to said detecting means to start the operation thereof.

16. A continuous automatic container inspecting apparatus as set forth in claim 6, wherein said selecting means comprises:

a first star wheel having formed along its circumference a plurality of recesses for receiving the respective containers held by said holders;

a second star wheel also having formed along it circumference a plurality of recesses for receiving the containers and arranged revolvable corresponding to said first star wheel so that the recesses of said both star wheels will meet each other successively;

means for driving said both star wheels;

jets opened to the bottoms of the recesses in said both star wheels;

a control means for supplying compressed air from an outside compressed air source to said jet leading to only one of the two meeting recesses of both star wheels in response to a signal from said detecting means; and passages for delivering out the container held by said star wheels.

17. An automatic container inspecting apparatus as set forth in claim 16, wherein said control means for supplying compressed air has passages opened in upper surfaces of said star wheels and connected to the jets opened to the bottoms of said recesses, and valve bodies provided stationary on the upper surfaces of said respective star wheels so that they are slidable relative to said respective star wheels, said valve bodies having in their undersides the arc-shaped grooves engaged with the passages leading to the two facing recesses of the two star wheels, each of said grooves being connected to an outside compressed air source through a solenoid valve controlled by the inspecting apparatus.

18. An automatic container inspecting apparatus as set forth in claim 6, wherein said holder train consists of a plurality of holders for rotatably holding the containers therein and a roller chain supporting said holders.

19. A continuous automatic container inspecting apparatus as set forth in claim 6, wherein each said holder comprises a bracket, means for retaining the bottom portion of the container rotatably sustained by said bracket, and means for holding the upper portion of the container rotatably and axially slidably sustained by said bracket, said means for holding the upper portion of the container comprising a pulley portion to which rotative force is given and an arm moved up and down by a cam provided along the passage of the holder train.

20. A continuous automatic container inspecting apparatus as set forth in claim 6, wherein said feeding means comprises a belt conveyor for successively feeding containers and a feed rotor having along its circumference a plurality of recesses and arranged to rotate in conformity with said holder train, each of said recesses having at its bottom a compressed air jet from which compressed air is ejected so as to retain the container in the recess, whereby to transfer each container from said belt conveyor means to said holder train.

21. A continuous automatic container inspecting apparatus as set forth in claim 6, wherein said rotating means comprise a driving pulley, driven pulleys mounted on the respective threaded shafts, a belt connecting said driving and driven pulleys, and a scale plate provided parallel to the threaded shafts for indicating the position of said driven pulleys.

22. A continuous automatic container inspecting apparatus as set forth in claim 6, further including brake means for stopping rotation of the container held by a holder, said brake means being disposed between said rotating means and said detecting means.

23. A continuous automatic container inspecting apparatus comprising:
   means for feeding containers one by one successively;
   a holder assembly comprising a plurality of holders adapted to receive and rotatably hold the containers suppled from said feeding;
   means for moving said holder assembly;
   means for rotating the containers held in the moving holders;
   a fixed light source means for projecting light rays to the container which has been rotated, said light rays being greater in span than the container diameter;
   a shield plate having a light projecting hold through which light is projected to irradiate only one container, said shield plate being disposed between the container to be inspected said light source; and
   driving means for moving said shield plate along the path of movement of the container to be inspected in a manner such that said container is continuously irradiated by said light source through the hole of said shield plate, during the movement of said container and the shield plate, and returning said shield plate to its original position when the container reaches a certain point on the path.

24. A continuous automatic container inspecting apparatus as set forth in claim 23, further including means for generating a pulse when said shield plate is at a certain prescribed position.

25. A continuous automatic ampul inspecting apparatus comprising:
   means for feeding ampuls one by one successively;
   a holder assembly comprising a plurality of endlessly connected holders adapted to rotatably hold said respective ampuls;
   a pair of revolving members for continuously driving said holder assembly;
   means for rotating the ampuls retained by the holders transferred lineraly between said pair of revolving members;
   a light source means for projecting light to ampuls which have passed by said means for rotating ampuls and are being transferred linearly;
   a detecting means for capturing and detecting the irregular reflected light rays from flaws on and alien matters in each ampul, said detecting means being provided stationarily perpendicular to said linearly transferred holder assembly and having a greater field of view than said ampul; and
   a selecting means operable responding to said detecting means for selecting and discharging the nondefective and defective ampuls respectively.

26. A continuous automatic ampul inspecting apparatus as set forth in claim 25, wherein each said holder comprises a bracket, means for receiving the bottom portion of the ampul, said means being provided rotatably at the bottom of said bracket, and means for holding the upper portion of the ampul, said means being provided rotatably and vertically movably on said bracket at a location upward of and on the same axis as said ampul bottom receiving means, said means for holding the upper portion of the ampul including a hollow ampul shoulder holder and an ampul end receiver mounted vertically movably therein.

27. A continuous automatic ampul inspecting apparatus as set forth in claim 26, wherein said ampul bottom receiving means comprises a hollow cylindrical member having an inner diameter greater than the outer diameter of the ampul, a hollow sleeve provided vertically movably therein for resting only the outer peripheral portion of the ampul, and means for engaging said hollow sleeve at a position slightly lower than the top face of said hollow cylindrical member.

28. A continuous automatic ampul inspecting apparatus as set forth in claim 26, wherein said means for holding the upper portion of the ampul comprises a pulley portion to which rotation is given, and an arm moved up and down by a cam provided along the passage of the holder train.

* * * * *